US011277674B2

(12) United States Patent
Quek et al.

(10) Patent No.: US 11,277,674 B2
(45) Date of Patent: Mar. 15, 2022

(54) METHOD AND SYSTEM FOR PROMOTING INTERACTION DURING LIVE STREAMING EVENTS

(71) Applicant: Nooggi Pte Ltd, Singapore (SG)

(72) Inventors: Shu Ching Quek, Singapore (SG); Toi Mien Quek, Singapore (SG)

(73) Assignee: NOOGGI PTE LTD, Singapore (SG)

( * ) Notice: Subject to any disclaimer, the term of this patent is extended or adjusted under 35 U.S.C. 154(b) by 0 days.

(21) Appl. No.: 17/040,588

(22) PCT Filed: Apr. 4, 2018

(86) PCT No.: PCT/SG2018/050169
§ 371 (c)(1),
(2) Date: Sep. 23, 2020

(87) PCT Pub. No.: WO2019/194742
PCT Pub. Date: Oct. 10, 2019

(65) Prior Publication Data
US 2021/0076107 A1    Mar. 11, 2021

(51) Int. Cl.
*H04N 21/8547* (2011.01)
*G06F 40/58* (2020.01)
*H04N 5/278* (2006.01)
*H04N 21/2187* (2011.01)
*H04N 21/233* (2011.01)

(52) U.S. Cl.
CPC ........ *H04N 21/8547* (2013.01); *G06F 40/58* (2020.01); *H04N 5/278* (2013.01); *H04N 21/2187* (2013.01); *H04N 21/233* (2013.01)

(58) Field of Classification Search
None
See application file for complete search history.

(56) References Cited

U.S. PATENT DOCUMENTS

2005/0262539 A1\* 11/2005 Barton ................. G11B 27/322
725/90

FOREIGN PATENT DOCUMENTS

| CN | 106331844 A | 1/2017 |
| CN | 106454547 A | 2/2017 |

(Continued)

OTHER PUBLICATIONS

International Search Report PCT/SG2018/050169 (ISA/SG) dated Jul. 19, 2018.

*Primary Examiner* — Clifford Hilaire
(74) *Attorney, Agent, or Firm* — Daniel J. Chalker; Edwin S. Flores; Chalker Flores, LLP

(57) ABSTRACT

A method for promoting interaction during a live streaming event is disclosed. The method comprising the steps of receiving an audio feed and a visual feed of the live streaming event from a source device; partitioning with a uniform block length, the visual feed into visual feed partitions and the audio feed into audio feed partitions; and tagging a time-marker to each sentence in the audio feed. The method further comprises the steps of initiating a conversion of each sentence into a translated sentence while retaining the tagged time-markers, each translated sentence having an association with a visual feed partition and an audio feed partition; and waiting for a time delay to expire between transmitting a first partition, a second audio feed partition and the associated translated sentence with the tagged time-marker to the recipient device.

20 Claims, 12 Drawing Sheets

(56) References Cited

FOREIGN PATENT DOCUMENTS

CN 106791913 A 5/2017
JP 2017204695 A 11/2017

* cited by examiner ized Application No. PCT/SG2018/050169, filed on Apr. 4, 2018, the entire contents of which are incorporated herein by reference.

METHOD AND SYSTEM FOR PROMOTING INTERACTION DURING LIVE STREAMING EVENTS

CROSS-REFERENCE TO RELATED APPLICATIONS

This application is the National Stage of International Application No. PCT/SG2018/050169, filed on Apr. 4, 2018, the entire contents of which are incorporated herein by reference.

FIELD OF THE INVENTION

The invention pertains to a method and system for promoting interaction during live streaming events. Particularly, a social media platform having enhanced interactive features for live streaming events is described.

BACKGROUND

Social media platforms are ubiquitous in our society today. Such platforms like YouTube, Facebook and V-live have live-streaming facilities which allow their users to stream or broadcast live events, which can be viewed by other users. Celebrities have jumped on this bandwagon and are utilizing this medium to connect to their fans via the streaming of live interviews.

However, the current offerings suffer from a dearth of interactive features, and are therefore unable to properly simulate an actual "meet and greet" event. A common obstacle is the language barrier and a Chinese fan may not be able to understand a live-streamed interview being conducted in the Korean language for a Korean celebrity. Furthermore, there exists no current mechanism for the Chinese fan to actively participate in the live-streamed interview, say for example, to send gifts to the Korean celebrity or communicate with the Korean celebrity.

Thus, what is required is a novel method or novel social media platform with enhanced interactive features for live streaming events, which promotes user participation, to further the overall online "meet and greet" experience. Furthermore, other desirable features and characteristics will become apparent from the subsequent detailed description and the appended claims, taken in conjunction with the accompanying drawings and this background of the disclosure.

SUMMARY OF INVENTION

According to a first aspect of the invention, a method for promoting interaction during a live streaming event is disclosed. The method comprising the steps of receiving an audio feed and a visual feed of the live streaming event from a source device; partitioning with a uniform block length, the visual feed into visual feed partitions and the audio feed into audio feed partitions; and tagging a time-marker to each sentence in the audio feed. The method further comprises the steps of initiating a conversion of each sentence into a translated sentence while retaining the tagged time-markers, each translated sentence having an association with one of the visual feed partitions and one of the audio feed partitions; and waiting for a time delay to expire between transmitting a first visual feed partition to a recipient device, before transmitting a second visual feed partition, a second audio feed partition and the associated translated sentence with the tagged time-marker to the recipient device.

Preferably, the time delay is equal to the block length.

Preferably, the step of tagging a time-marker to a sentence in the audio feed comprises the steps of maintaining a time counter, the time counter tracking a runtime of the visual feed; assigning the time-marker with a value of the time counter when a start of the sentence has been determined; and tagging the time-marker to the sentence.

Preferably, the step of tagging a time-marker to a sentence in the audio feed further comprises the steps of detecting that a part of the sentence is not within the same audio feed partition as the start of the sentence; extracting the part of the sentence from the sentence to create a new sentence; assigning another time-marker with a value of the time counter when a start of the part of the sentence has been determined; and tagging the another time-marker to the new sentence.

Preferably, the method further comprises the steps of determining a start of another sentence, the start of the another sentence within the same audio feed partition as the sentence; detecting that a part of the another sentence is not within the same audio feed partition as the start of the another sentence; assigning another time-marker with a value of the time counter when a start of the part of the another sentence has been determined; and tagging the another time-marker to the another sentence.

Preferably, the step of initiating a conversion of the sentences into translated sentences comprises the steps of sending the sentences to a voice recognition engine, the voice recognition engine for extracting voice recognition components from the sentences; and receiving the translated sentences from a translation engine, the translation engine for generating the translated sentences from the voice recognition component.

Preferably, the visual feed partitions and the audio feed partitions and the translated sentences with the tagged time-markers are transmitted to the recipient device in separate signals or are encoded together and transmitted to the recipient device in one signal.

Preferably, the translated sentences are in the form of translated text or translated speech.

Preferably, the translated sentences are in a language which is pre-selected by a user of the recipient device or are in a language which is selected based on receiving location information of the recipient device.

Preferably, the method further comprises the step of initiating the censorship of the audio feed and the visual feed.

Preferably, the method further comprises the steps of receiving an e-commerce transaction request from the recipient device during the live streaming event, the e-commerce transaction request associated with at least one gift item; approving the e-commerce transaction request; selecting a vendor based on the at least one gift item; and sending dispatch instructions to the vendor to deliver the at least one gift item.

Preferably, the step of selecting a vendor based on the at least one gift item further comprises the steps of receiving location information of the source device; determining a delivery location from the location information of the source device; and searching for the closest vendor in an expanding perimeter fashion from the delivery location.

Preferably, the method further comprises the step of augmenting the visual feed partitions prior to transmission to the recipient device.

Preferably, an event ID and a language ID are tagged to the translated sentences and the translated sentences are transmitted to the recipient device in accordance with the tagged event ID tag and the tagged language ID.

Preferably, the method further comprises the step of archiving the audio feed, the visual feed and a plurality of translated sentences with tagged time-markers as a video file.

Preferably, there is an overlap between the first visual feed partition and the second visual feed partition (consecutive visual feed partitions).

Preferably, the method further comprises the step of providing integrated functionality for communication with members of other social media platforms during the live streaming event.

According to a second aspect of the invention, a system for promoting interaction during a live streaming event is described, the system comprising at least one server configured to perform any one of the above described methods.

According to a third aspect of the invention, a method for promoting interaction during a live streaming event is described, the method comprising the steps of receiving an audio feed and a visual feed of the live streaming event from a source device; partitioning with a uniform block length, the visual feed into visual feed partitions and the audio feed into audio feed partitions; and tagging a time-marker to each sentence in the audio feed. The method further comprises the steps of initiating a conversion of each sentence into a translated sentence while retaining the tagged time-markers, the translated sentence having an association with one of the visual feed partitions and one of the audio feed partitions; and playing another one of the visual feed partitions and waiting for a time delay to expire before playing or displaying the one of the visual feed partitions, the one of the audio feed partitions and the associated translated sentence according to the tagged time-marker.

Preferably, the translated sentences are in the form of translated text, and the translated sentences are displayed as subtitles according to the tagged time-markers, or wherein the translated sentences are in the form of translated speech, and the translated sentences are played according to the tagged time-markers while the playing of the audio feed partition is suppressed.

According to a fourth aspect of the invention, a system for promoting interaction during a live streaming event is described, the system comprising at least one recipient device configured to perform any one of the above described methods.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments, by way of example only, and to explain various principles and advantages in accordance with a present embodiment.

Figure 1:
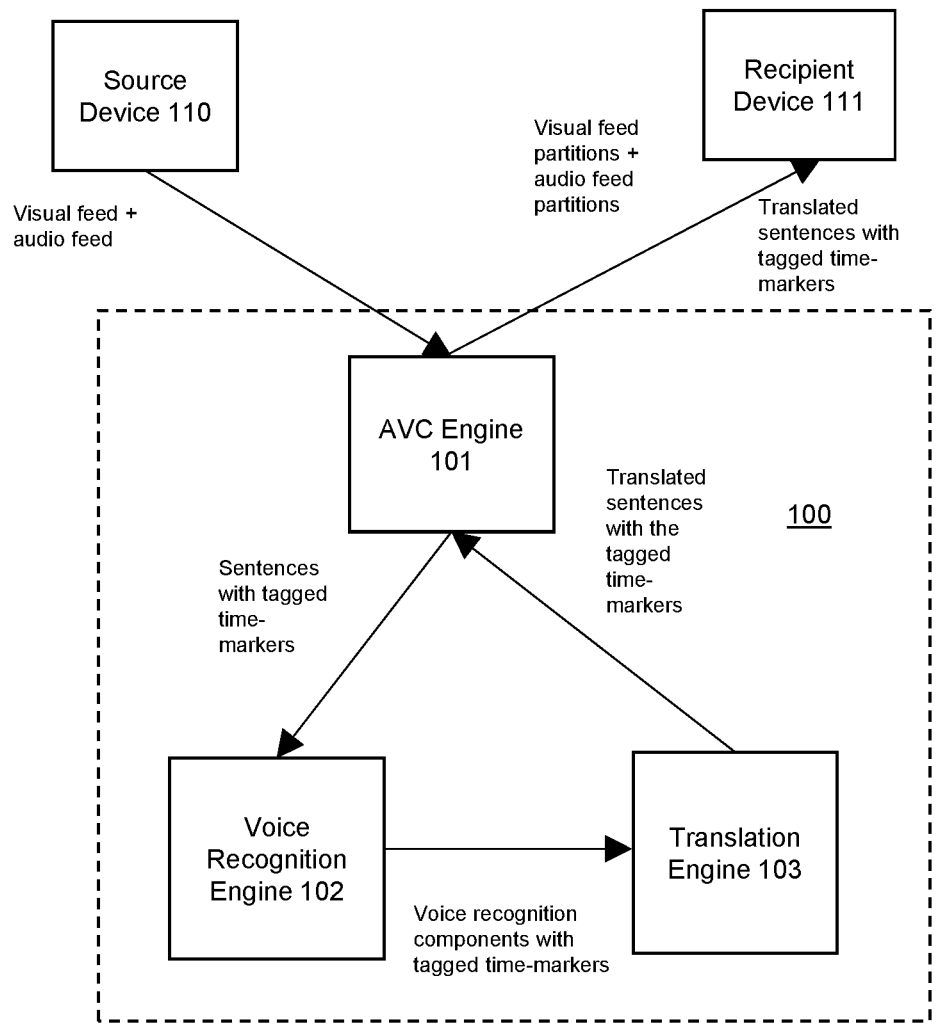
FIG. 1 shows a system for promoting interaction during a live streaming event by providing translated sentences, in accordance with embodiments of the invention.

Skilled artisans will appreciate that elements in the figures are illustrated for simplicity and clarity and have not necessarily been depicted to scale. For example, the dimensions of some of the elements in the block diagrams or steps in the flowcharts may be exaggerated in respect to other elements to help improve understanding of the present embodiment.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of certain embodiments to disclose a method for promoting interaction during a live streaming event, the method comprising the steps of receiving an audio feed and a visual feed of the live streaming event from a source device; and partitioning with a uniform block length, the visual feed into visual feed partitions and the audio feed into audio feed partitions. The method further comprises the steps of tagging a time-marker to each sentence in the audio feed; and initiating a conversion of each sentence into a translated sentence while retaining the tagged time-markers, each translated sentence having an association with one of the visual feed partitions and one of the audio feed partitions. The method further comprises the steps of waiting for a time delay to expire between transmitting a first visual feed partition to a recipient device, before transmitting the second visual feed partition, the second audio feed partition and the associated translated sentence with the tagged time-marker to the recipient device.

The inherent difficulty in providing translated content for a live streaming event is that one has time constraints in preparing the translated content. Furthermore, if one intends to ensure that the translated content is synchronized with the visual feed, the time taken to prepare the translated content will affect the continuity of the visual feed and cause gaps or interruptions in the visual feed once the preparation of the translated content cannot "keep up". This problem does not exist for a pre-recorded event as the translated content can be prepared beforehand (prior to the pre-recorded event being viewed) and synchronized with the visual content.

Certain embodiments of the invention as disclosed herein can solve the above identified problem and are capable of providing translated sentences synchronized with the visual feed of the live-streaming event, yet avoiding gaps in the visual feed, and providing the recipient device with an uninterrupted and continuous transmission of the live-streaming event. Certain embodiments teach that after receipt of the audio feed and the visual feed, the audio feed and the visual feed are partitioned into visual feed partitions and audio feed partitions, the partitions having a uniform block length (for example, the block length can be 8 seconds). A time-marker is then tagged to each sentence in the audio feed. In the context of this disclosure, a sentence is a portion of the audio feed comprising the speech of one sentence. The audio feed can comprise a plurality of sentences. The sentences are converted into translated sentences while retaining the tagged time-markers.

From the time of its receipt, the first visual feed partition and the first audio feed partition are held for a time delay before they are sent to the recipient device along with a first translated sentence. The first translated sentence has a tagged time-marker and has an association with (or corresponds with) the first visual feed partition and the first audio feed partition. The purpose of holding the first visual feed partition and the first audio feed partition for the time delay is to wait for the first translated sentence to be prepared (and other necessary processing, data transfer between servers etc). The time delay is preferably equal to the block length (or in this example, 8 seconds) so that the recipient device can receive a constant and continuous stream of the visual feed and the audio feed.

Certain embodiments then teach waiting for the same time delay (e.g. 8 seconds) to expire between sending the first visual feed partition, before sending the second visual feed partition and the second audio feed partition to the recipient device, along with the second translated sentence. The second translated sentence has a tagged time-marker and has an association with (or corresponds with) the second visual feed partition and the second audio feed partition. The purpose of this time delay of 8 seconds between sending the first visual feed partition and the second visual feed partition is to wait for the second translated sentence to be prepared, and also to ensure that a constant and continuous stream of the visual feed and the audio feed are sent to the recipient device. This process is then repeated for the subsequent visual feed partitions and audio feed partitions and their associated translated sentences.

On the recipient device's end, it receives the first 8 seconds of the visual feed (i.e. the first visual feed partition) and the first 8 seconds of the audio feed (i.e. the first audio feed partition) and the first translated sentence. 8 seconds later, the recipient device receives the next 8 seconds of the visual feed (i.e. the second visual feed partition) and the next 8 seconds of the audio feed (i.e. the second audio feed partition) and the second translated sentence. Therefore, in every 8 seconds interval, the recipient device will receive 8 seconds of the visual feed and the audio feed, and any translated sentence(s) associated with that 8 seconds of the visual feed and the audio feed.

As such, the playing of the visual feed and the audio feed on the recipient device is continuous and smooth and without gaps, while the translated sentences are synchronized with the visual feed (for example, the subtitles will be displayed in tandem with the movement of the speaker's mouth). In such a manner, the user of the recipient device will be able to advantageously view and listen to the live-streaming event in near or substantially real-time (as there is an initial delay of 8 seconds as the first visual feed partition and the first audio feed partition are held for the time delay of 8 seconds before transmission) without interruption, and with subtitles in his/her preferred language synchronized to the performance in the live-streaming event. This enhances the overall interactive experience and will encourage the user to participate in the live-streaming event.

Certain embodiments teach tagging a time-marker to each sentence in the audio feed by maintaining a time counter, the time counter tracking a runtime of the visual feed; assigning the time-marker with a value of the time counter when a start of the sentence has been determined; and tagging the time-marker to the sentence.

When it has been detected that a sentence is not completely within a single audio feed partition (or visual feed partition), and a part of the sentence overflows to the next audio feed partition, certain embodiments teach extracting the part of the sentence to create a new sentence. Then, a time-marker is assigned with a value of the time counter when a start of the part of the sentence has been determined; and the time-marker is tagged to the new sentence. Therefore, sentences that run past the length of an audio feed partition are "broken up", with the "broken up" portion tagged to a time-marker which corresponds to the next audio feed partition. In other words, "long" sentences are broken up into "shorter" sentences so that the "shorter" translated sentences will be played in sync with the visual feed partitions and the audio feed partitions.

When it has been detected that there is a first sentence and a second sentence within a single audio feed partition (or visual feed partition), and a part of the second sentence overflows to the next audio feed partition, certain embodiments teach assigning a time-marker with a value of the time counter when a start of the part of the second sentence has been determined; and tagging the time-marker to the second sentence. Therefore, the second translated sentence will be played with the next audio feed partition. In this scenario, the second translated sentence will not be "completely synchronized" with the visual feed and the audio feed. This is because the second translated sentence will only be played with the second part of the second sentence (the next audio feed partition) and not with the first part of the second sentence. This is however an acceptable compromise because if "part of" the translated sentences were to appear in tandem with the "part of" the sentences in the audio feed partition, there can be situations where these partial translated sentences lose their original meaning. Therefore, in certain embodiments, the invention prioritizes the preservation of the overall meaning of the translated sentences over the "complete synchronization" of the visual feed and the audio feed with the translated sentences.

In embodiments, the conversion of a sentence into a translated sentence can be initiated by sending the sentence to a voice recognition engine. The voice recognition engine (which can be implemented by a third party) can extract a voice recognition component from the sentence. A translation engine (which can be implemented by a third party) can then generate the translated sentence from the voice recognition component.

In certain embodiments, the visual feed partitions and the audio feed partitions and the translated sentences with the tagged time-markers are transmitted to the recipient device in separate signals. In certain embodiments, the visual feed partitions and the audio feed partitions and the translated sentences with the tagged time-markers are encoded together and transmitted to the recipient device in one signal.

Embodiments of the present invention will be described, by way of example only, with reference to the drawings. Like reference numerals and characters in the drawings refer to like elements or equivalents.

FIG. 1 shows a system 100 for promoting interaction during a live streaming event by providing translated content or translated sentences, in accordance with certain embodiments. System 100 can comprise Audiovisual content (AVC) engine 101. AVC engine 101 can be any server, computer, or a group of servers or a group of computers or the like. In embodiments, AVC engine 101 can be configured to receive Audiovisual content (AVC) of the live streaming event from source device 110, and send the AVC to recipient device 111. AVC engine 101 can be configured to store the received AVC. Source device 110 and recipient device 111 can be any smart phone, tablet, electronic device, desktop or laptop computer, computer terminal, wearable technology device, or the like. In embodiments, the AVC comprise a visual feed and an audio feed, and AVC engine 101 can be configured to receive the visual feed and the audio feed. In embodiments, the audio feed can comprise a plurality of sentences. In the context of this disclosure, a sentence is a portion of the audio feed comprising the speech of one sentence.

In embodiments, AVC engine 101 can be configured to partition the visual feed into visual feed partitions. Preferably, the partitioning is such that the visual feed partitions have a uniform (the same) block length. The block length can be for example, 6 seconds, 8 seconds or within a range of 6 seconds and 8 seconds (this is because an average sentence length is typically between 6 to 8 seconds), but not limited thereto. In embodiments, adapting algorithms can be used to vary the block length of the partitions to determine the optimal block length. If the visual feed is 24 seconds in total, and the uniform block length is 8 seconds, AVC engine 101 will partition the visual feed into 3 visual feed partitions, each having a block length of 8 seconds. A skilled person would understand that sometimes the last visual feed partition will not have the same block length as the other partitions. For example, if the visual feed is 30 seconds in total, the last visual feed partition would only have a block length of 6 seconds. In embodiments, AVC engine 101 can be configured to partition the audio feed into audio feed partitions in the same manner as the visual feed partitions.

In embodiments, the partitioning of the visual feed into visual feed partitions and the audio feed into audio feed partitions can be such that there is an overlap between consecutive partitions. The overlap can be for example 1 second or 2 seconds. For instance, assuming the partitions have a block length of 8 seconds, the partitioning can be such that the "last 2 seconds" of a first partition can be replicated in the "first 2 seconds" of a second partition. The "last 2 seconds" of a second partition can be replicated in the "first 2 seconds" of a third partition, and so on. The overlap between the partitions is to ensure a smoother transition between the partitions when they are played on recipient device 111. It is preferable that the overlap is consistent throughout all the partitions.

In embodiments, AVC engine 101 can be configured to tag a time-marker to each sentence in the audio feed. In the context of this invention, a sentence is a portion of the audio feed comprising the spoken speech of one sentence. For instance, the first sentence would be the portion of the audio feed comprising the spoken speech of a first sentence while the second sentence would be the portion of the audio feed comprising the spoken speech of a second sentence. AVC engine 101 can be configured to tag a time-marker to a sentence by assigning a time-marker with a value of a time counter when an start of a sentence is detected, and then tag the time-marker to the sentence. For example, when AVC engine 101 detects the first significant peak in the audio feed (which will correspond to the start of the first sentence), AVC engine 101 will assign a first time marker (T_mark 1) with the value of a time counter at that point in time. The time counter can track the runtime of the visual feed. The value of T-mark 1 can be for example in seconds and/or milliseconds. T-mark 1 can be the time elapsed from the commencement of the visual feed to the time when the first significant peak was detected in the audio feed. AVC engine 101 tags T_mark 1 to the first sentence. The time-marker acts as a cue or indicator of when to display the translated sentence (as subtitles) or play the translated sentence (as translated speech) on the recipient device 111 (which will be explained in detail later on) so that they will be in sync with the visual feed (for example, with the movement of the mouth of the speaker).

When AVC engine 101 detects the next significant peak in the audio feed (which will correspond to the start of the second sentence), AVC engine 101 will assign a second time marker (T_mark 2) with the value of the time counter at that point in time. AVC engine 101 then tags T_mark 2 to the second sentence. AVC engine 101 repeats this process as it continues to receive the audio feed.

Figure 2:
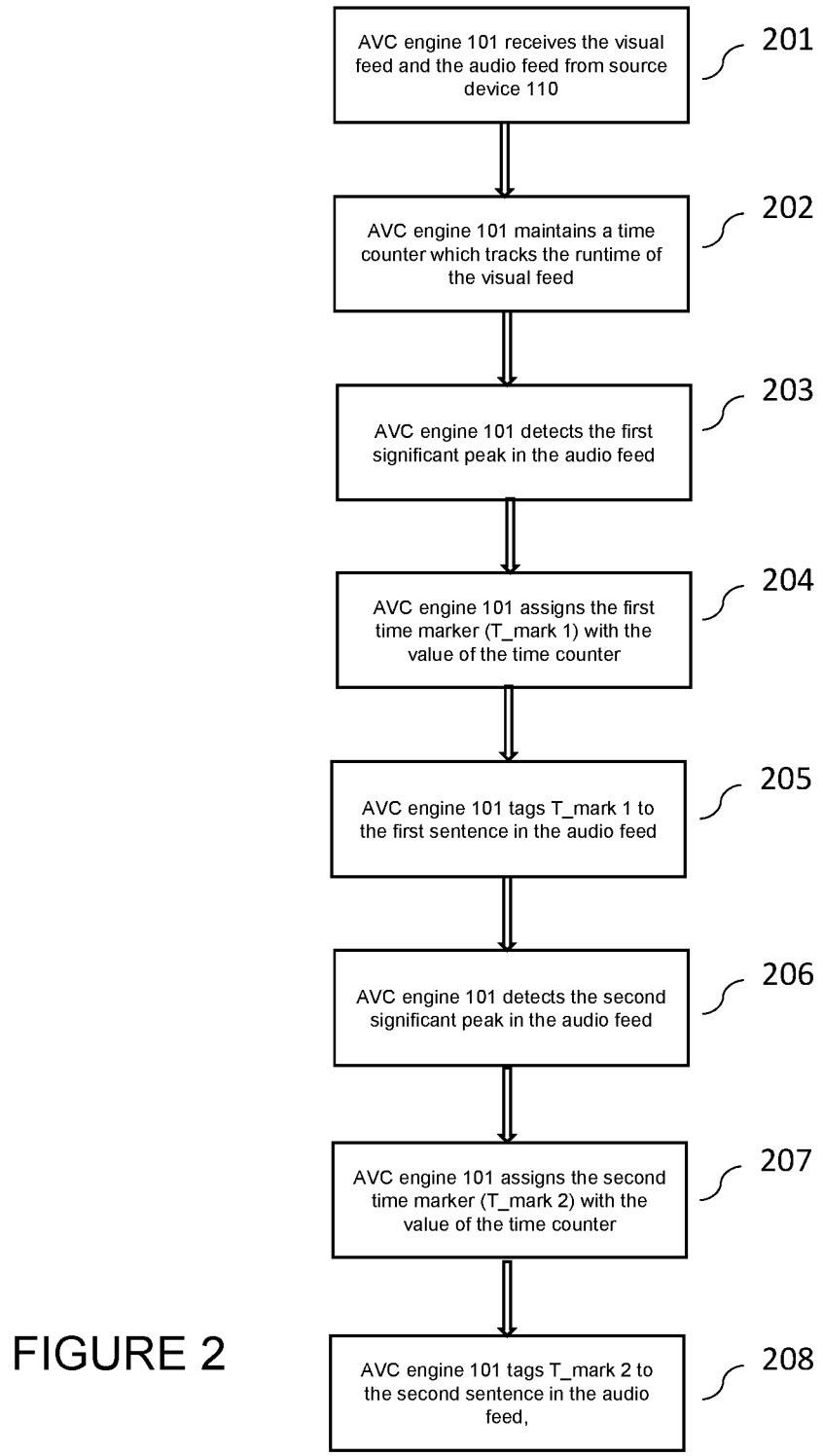
FIG. 2 is a flowchart which depicts a method for tagging the time-markers to sentences in the audio feed, in accordance with embodiments of the invention.
Figure 3:
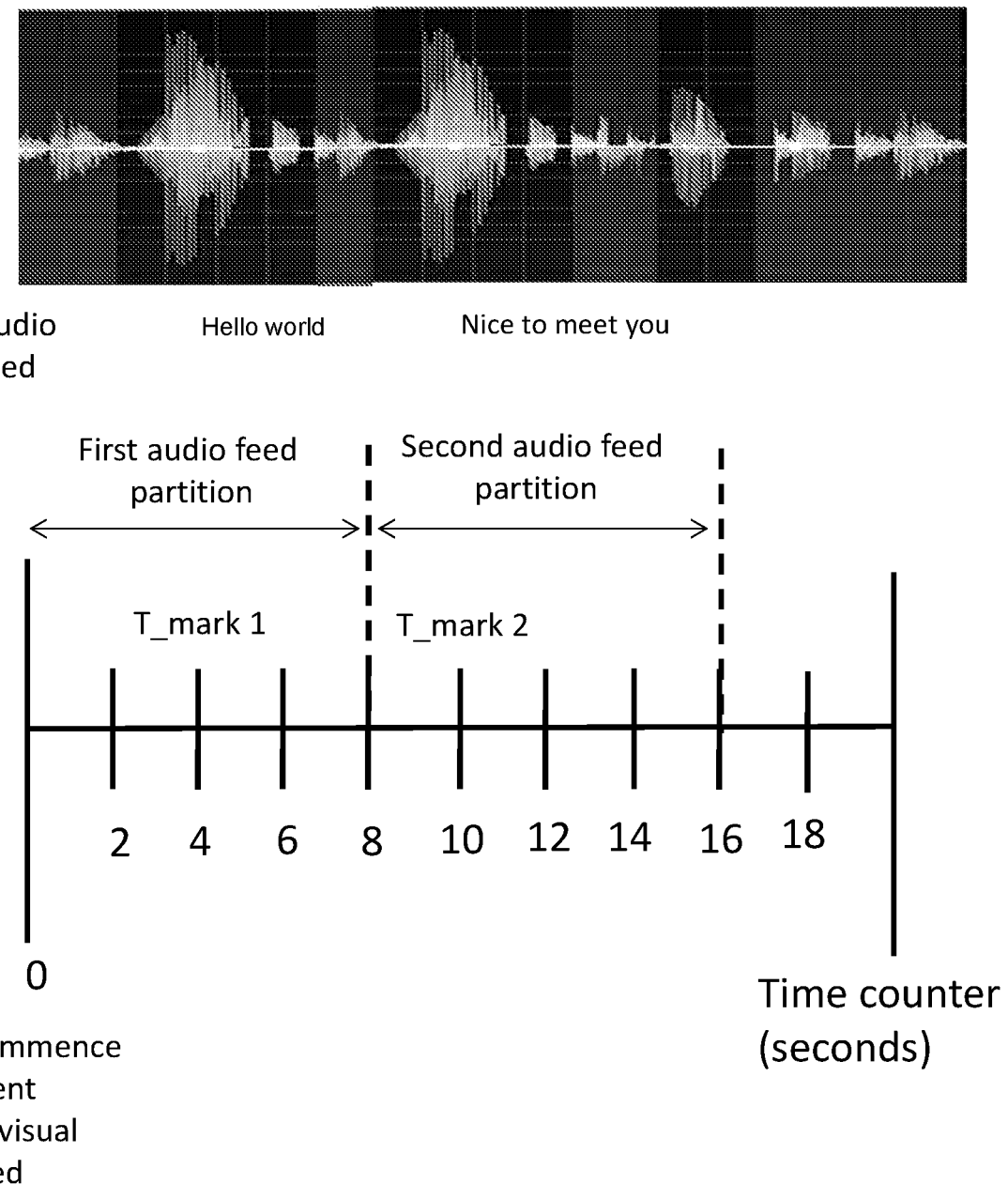
FIG. 3 provides an illustration of tagging the time-markers to sentences in the audio feed, in accordance with embodiments of the invention.
Figure 4:
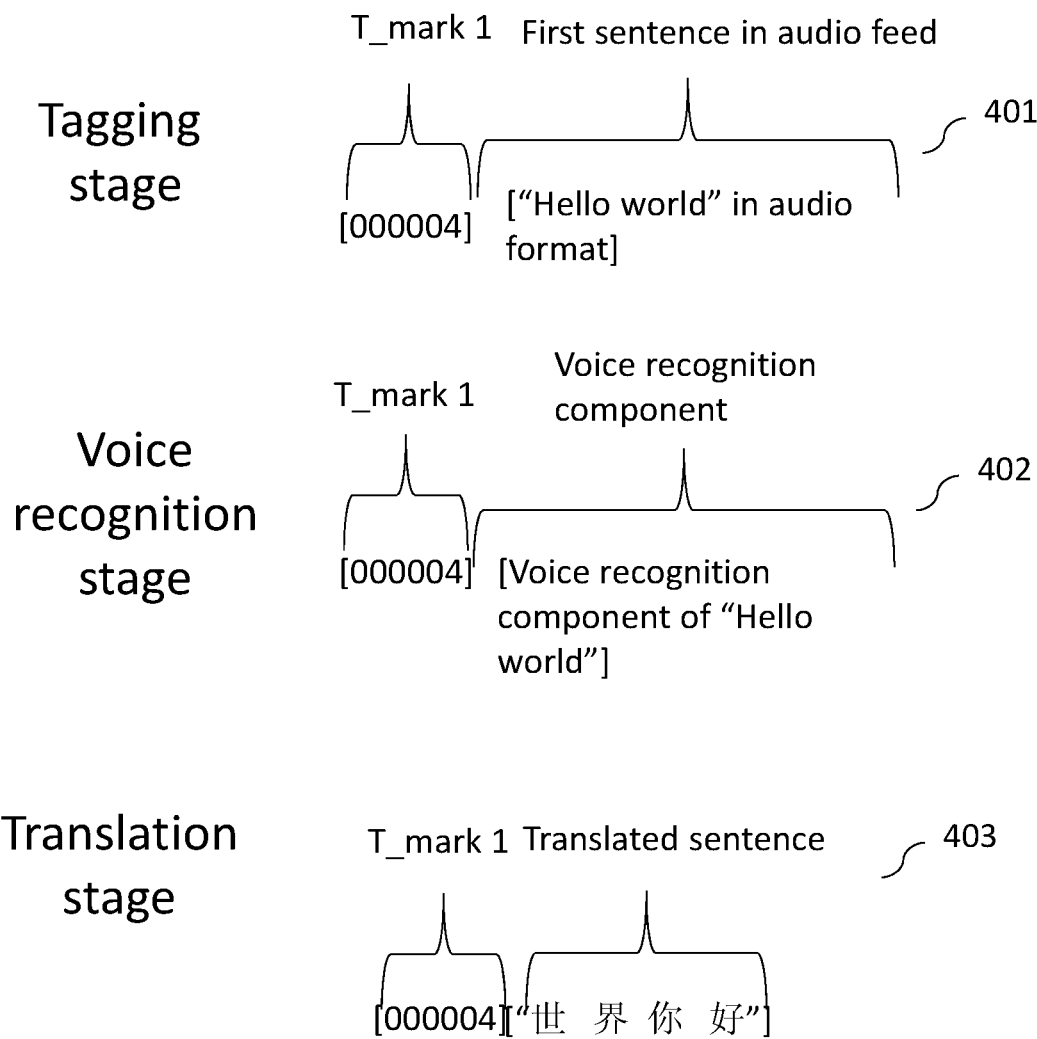
FIG. 4 shows the metamorphosis of a data set as it transitions through the tagging stage, the voice recognition stage and the translation stage, in accordance with embodiments of the invention.
Figure 5:
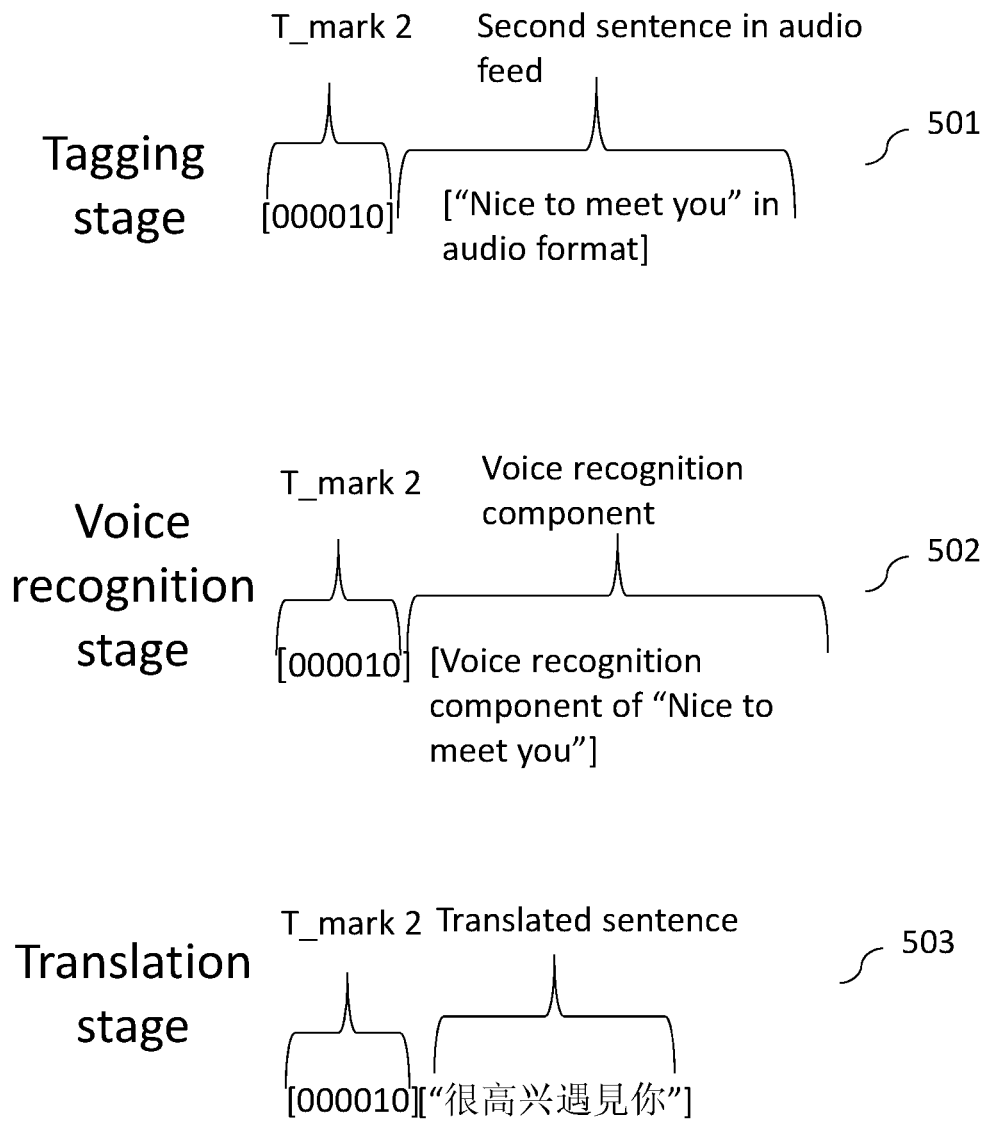
FIG. 5 shows the metamorphosis of a data set as it transitions through the tagging stage, the voice recognition stage and the translation stage, in accordance with embodiments of the invention.

FIG. 2 is a flowchart which depicts a method for tagging time-markers to sentences in the audio feed, in accordance with certain embodiments. FIG. 3 provides an illustration of tagging time-markers to sentences in the audio feed, in accordance with certain embodiments. The audio feed in this example comprises two sentences: "Hello world". "Nice to meet you". The first sentence "Hello world" is within the first audio feed portion. The second sentence "Nice to meet you" is within the second audio feed portion. FIG. 4 shows the metamorphosis of a data set pertaining to the first sentence "Hello world" as it transitions through the tagging stage, the voice recognition stage and the translation stage to transform to a first translated sentence, in accordance with embodiments of the invention. FIG. 5 shows the metamorphosis of a data set pertaining to the second sentence "Nice to meet you" as it transitions through the tagging stage, the voice recognition stage and the translation stage to transform to a second translated sentence, in accordance with embodiments of the invention.

In step 201 of FIG. 2, AVC engine 101 receives the visual feed and the audio feed from source device 110. AVC engine 101 can store the visual feed and the audio feed. AVC engine 101 can store the visual feed and the audio feed in a buffer.

In step 202, AVC engine 101 maintains a time counter which tracks the runtime of the visual feed. The time counter can be incremented in units of time (seconds and/or milliseconds).

In step 203, AVC engine 101 detects the first significant peak in the audio feed (which corresponds to the start of the first sentence in the audio feed). AVC engine 101 detects the first significant peak at the point in time when the word "Hello" is spoken (see FIG. 3).

In step 204, AVC engine 101 assigns the first time marker (T_mark 1) with the value of the time counter when AVC engine 101 detects the first significant peak in the audio feed. As illustrated in FIG. 3, the first significant peak is detected by AVC engine 101 when the time counter equals 4 seconds. Therefore, AVC engine 101 assigns T_mark 1 with the value of "4 seconds".

In step 205, AVC engine 101 tags T_mark 1 to the first sentence in the audio feed: "Hello world". Data set 401 in FIG. 4 illustrates T_mark 1 being tagged to the first sentence.

In step 206, AVC engine 101 detects the second significant peak in the audio feed (which corresponds to the start of the second sentence in the audio feed). AVC engine 101 detects the second significant peak at the point when the word "Nice" is spoken (see FIG. 3).

In step 207, AVC engine 101 assigns the second time marker (T_mark 2) with the value of the time counter when AVC engine 101 detects the second significant peak. As illustrated in FIG. 3, the second significant peak is detected by AVC engine 101 when the time counter equals 10 seconds. Therefore, AVC engine 101 assigns T_mark 2 with the value of "10 seconds".

In step 208, AVC engine 101 tags T_mark 2 to the second sentence in the audio feed: "Nice to meet you". Data set 501 in FIG. 5 illustrates T_mark 2 being tagged to the second sentence.

Although the above example describes only a first and a second time-marker being tagged to the first and second sentences respectively, this is for illustration purposes only and a skilled person would understand that the number of time-markers tagged to sentences would be in tandem with the number of sentences in the audio feed. Furthermore, in embodiments, the time-markers can be implemented be recording the difference in time from the preceding time-marker instead of specific time values. For example, utilizing the example where T_mark 1 is 4 seconds and T_mark 2 is 10 seconds, T_mark 2 can be instead represented with the value of 6 seconds. Therefore in these embodiments, T_mark 2 indicates 6 seconds from T_mark 1 instead of the equivalent 10 seconds.

In embodiments, AVC engine 101 can be configured to initiate the conversion of each of the sentences into translated sentences, while retaining the tagged time-markers. The sentences (in a first language) can be converted to translated sentences (in a second language), while retaining the tagged time-markers. In embodiments, system 100 can comprise voice recognition engine 102 and translation engine 103. In embodiments, AVC engine 101 can be configured to send the sentences with the tagged time-markers to voice recognition engine 102. For example, AVC engine 101 sends data set 401 (i.e. T_mark 1 tagged to the first sentence) to voice recognition engine 102. AVC engine 101 then sends data set 501 (i.e. T_mark 2 tagged to the second sentence) to voice recognition engine 102.

In embodiments, voice recognition engine 102 can be configured to receive the sentences with the tagged time-markers, and extract voice recognition components from the sentences, while retaining the tagged time-markers. For example, voice recognition engine 102 receives data set 401 from AVC engine 101. Voice recognition engine 102 then extracts the voice recognition component of the first sentence ("Hello world"), while retaining the tag T_mark 1. Data set 402 in FIG. 4 shows T_mark 1 being tagged to the voice recognition component of "Hello world". Voice recognition engine 102 then receives data set 501 from AVC engine 101. Voice recognition engine 102 then extracts the voice recognition component of the second sentence ("Nice to meet you"), while retaining the tag T_mark 2. Data set 502 in FIG. 5 shows T_mark 2 being tagged to the voice recognition component of "Nice to meet you".

The voice recognition component can be in textual form. Alternatively, the voice recognition component can be in audio form, as voice recognition engine 102 can be configured to directly parse or recognize the audio sound of the words of the speech in the sentences. The voice recognition components can be in the same language as the language of the speech in the sentences. Though the above embodiments describe that the voice recognition is done sequentially, this is for illustration purposes only and voice recognition engine 102 can be configured to perform the voice recognition in parallel i.e. extract the voice recognition components from a plurality of sentences simultaneously.

In embodiments, voice recognition engine 102 can be configured to send the voice recognition components with the tagged time-markers to translation engine 103. For example, voice recognition engine 102 sends data set 402 to translation engine 103. Voice recognition engine 102 then sends data set 502 to translation engine 103.

In embodiments, translation engine 103 can be configured to receive the voice recognition components with the tagged time-markers from voice recognition engine 102. Translation engine 103 can be configured to generate translated sentences from the voice recognition components, while retaining the tagged time-markers. For example, translation engine 103 receives data set 402 from voice recognition engine 102. Translation engine 103 then generates the translated sentence by translating the voice recognition component of "Hello world" to the translated sentence "世界你好", while retaining the tag T_mark 1. Data set 403 in FIG. 4 shows T_mark 1 being tagged to the translated sentence "世界你好". Translation engine 103 then receives data set 502 from voice recognition engine 102. Translation engine 103 then generates the translated sentence by translating the voice recognition component of "Nice to meet you" to the translated sentence "很高兴遇见你", while retaining the tag T_mark 2. Data set 503 in FIG. 5 shows T_mark 2 being tagged to translated sentence "很高兴遇见你".

The translated sentences can be the voice recognition components having been translated from the first language to the second language. The translated sentences can be in the form of translated text or translated speech, or both. In embodiments, the second language or translated language can be specified via translation engine 103 receiving a "preferred language selection" from recipient device 111. Alternatively, AVC engine 101 can be configured to receive the "preferred language selection" from recipient device 111, and send the "preferred language selection" to translation engine 103. If no "preferred language selection" is received from recipient device 111, in embodiments, translation engine 103 can be configured to receive the location information of recipient device 111, and use the primary language spoken in the country or city of which the location information indicates, as the default second language or translated language. The location information can be for example, the Global Positioning Satellite (GPS) coordinates of recipient device 111, the country code of a mobile number, an Internal Protocol (IP) address etc. Alternatively, AVC engine 101 can be configured to receive the location information of recipient device 111, determine the default second language from the location information, and relay it to translation engine 103.

Though the above embodiments describe that the translation of the voice recognition components are done sequentially, this is for illustration purposes only and translation engine 103 can be configured to perform translations of multiple voice recognition components in parallel. Translation engine 103 can also perform multiple translations of a single voice recognition component in parallel, for example, translating a single voice recognition component to the Korean, Spanish, French and Japanese languages concurrently. Therefore, multiple translated sentences are generated from a single voice recognition component.

Translation engine 103 can be configured to send the translated sentences with the tagged time-markers to AVC engine 101. For example, translation engine 103 sends data set 403 to AVC engine 101. Translation engine 103 then sends data set 503 to AVC engine 101.

Voice recognition engine 102 and translation engine 103 can be any server, computer, or be part of the same group of servers or a group of computers or the like. In embodiments, AVC engine 101, voice recognition engine 102 and translation engine 103 can be the same server or servers. In embodiments, voice recognition engine 102 and/or translation engine 103 can be implemented by external third party servers. In embodiments, the functionality or the application programming interface (API) of voice recognition engine 102 and/or translation engine 103 can be implemented by external third party servers. In other words, in certain embodiments, the voice recognition stage and the translation stage can be outsourced and performed by third parties.

In embodiments, AVC engine 101 can be configured to receive the translated sentences with the tagged time-markers from translation engine 103. For example, AVC engine 101 receives data set 403 from translation engine 103. AVC engine 101 then receives data set 503 from translation engine 103.

In embodiments, AVC engine 101 can be configured to transmit the audio feed, the visual feed and the translated sentences with the tagged time-markers to recipient device 111. In embodiments, from the time it receives the visual feed and the audio feed, AVC engine 101 can wait for a time delay (e.g. 8 seconds to expire before transmitting the first visual partition, the first audio feed partition and the first translated sentence to recipient device 111. If the partitions have a block length of 8 seconds, this means that AVC engine 101 will send "8 seconds worth" of the visual feed and "8 seconds worth" of the audio feed to recipient device 111.

The first translated sentence has a tagged time-marker and has an association with (or corresponds with) the first visual feed partition and the first audio feed partition. Preferably, the time delay is equal to the block length of the partitions. The purpose for waiting for the time delay is to cater to the preparation of the first translated sentence. However, in instances where there are no sentences (no speech) during the first audio partition (but just background noise for example) there will obviously be no translated sentence associated with the first audio partition or first visual partition. In such cases, AVC engine 101 can still wait for the time delay before sending the first visual feed partition and the first audio feed partition.

In embodiments, recipient device 111 can be configured to receive the first visual feed partition, the first audio feed partition and the first translated sentence. In embodiments, recipient device 111 can be configured to display the first visual feed partition on a display screen and play the first audio feed partition on an audio speaker. If the first translated sentence is in the form of translated text, recipient device 111 can be configured to display, according to the tagged time-marker, the first translated sentence on the display screen. Preferably, the first translated sentence is superimposed over the first visual feed partition as subtitles. For instance, with reference to data set 403, recipient device 111 will superimpose the first translated sentence "世界你好" over the visual feed as subtitles, 4 seconds (as T_mark 1=4) from the start of the display of the first visual feed partition on the display screen of recipient device 111. If the first translated sentence is in the form of a translated speech, recipient device 111 can be configured to play "世界你好" on the audio speaker, 4 seconds from the start of the display of the first visual feed partition on the display screen of recipient device 111. In embodiments, recipient device 111 can be configured to play the first translated sentence on the audio speaker while suppressing (or drowning) the first audio feed partition to help with the audibility of the first translated sentence.

In embodiments, AVC engine 101 then waits for the same time delay again (8 seconds) before transmitting the second visual feed partition, the second audio feed partition and the second translated sentence to the recipient device. The second translated sentence has a tagged time-marker and has an association with (or corresponds with) the second visual feed partition and the second audio feed partition. The purpose for waiting for the time delay is to cater to the preparation of the second translated sentence, and also to ensure that a constant and continuous stream of the visual feed and the audio feed is sent to the recipient device.

In embodiments, recipient device 111 can be configured to receive the second visual feed partition, the second audio feed partition and the second translated sentence. In embodiments, recipient device 111 can be configured to display the second visual feed partition on the display screen and play the second audio feed partition on the audio speaker. If the second translated sentence is in the form of translated text, recipient device 111 can be configured to superimpose the second translated sentence over the second visual feed partition as subtitles. For instance, with reference to data set 503, recipient device 111 will superimpose the second translated sentence "很高兴遇见你" over the second visual feed partition as subtitles, 10 seconds (as T_mark 2=10) from the start of the display of the first visual feed partition on the display screen of recipient device 111. If the second translated sentence is in the form of a translated speech, recipient device 111 can be configured to play "很高兴遇见你" on the audio speaker, 10 seconds from the start of the display of the first visual feed partition on the display screen of recipient device 111. In embodiments, recipient device 111 can be configured to play the second translated sentence on the audio speaker while suppressing (or drowning) the second audio feed partition to help with the audibility of the second translated sentence. This process is then repeated for the subsequent visual feed partitions and audio feed partitions and their associated translated sentences.

Below is a summary of the sequence of events that occur on recipient device 111 with reference to the above example:
1. Recipient device 111 receives the first audio feed partition (8 seconds worth), the first visual feed partition (8 seconds worth) and the first translated sentence (with T_mark 1 at 4 seconds).
2. For the next 8 seconds, recipient device 111 plays the first audio feed partition and the first visual feed partition for 8 seconds, and superimposing "世界你好" over the first visual feed partition as subtitles at the 4 second mark (i.e. 4 seconds from when the start of the first visual feed partition is played).
3. Recipient device 111 receives the second audio feed partition (8 seconds worth), the second visual feed partition (8 seconds worth) and the second translated sentence (with T_mark 2 at 10 seconds).

4. For the next 8 seconds, recipient device 111 plays the second audio feed partition and the second visual feed partition, and superimposing "很高兴遇见你" over the second audio feed partition as subtitles at the 10 second mark (i.e. 10 seconds from when the start of the first visual feed partition is played).

Therefore, recipient device 111 advantageously receives an uninterrupted and continuous transmission of the live-streaming event with translated sentences being synchronized with the live-streaming event. The user of recipient device 111 will thus be able to view and listen to the live-streaming event with subtitles or speeches in his/her preferred language synchronized to the performance in the live-streaming event. This enhances the overall interactive experience and will encourage the user to participate in the live-streaming event.

Though only one recipient device 111 is illustrated in FIG. 1, it is obvious to a skilled person that system 100 can accommodate a plurality of recipient devices 111. In embodiments, AVC engine 101 can be configured to transmit the audio feed partitions, the visual feed partitions and the translated sentences with the tagged time markers simultaneously to a plurality of recipient devices 111. The translated sentences sent to each of the plurality of recipient devices 111 can be in different languages.

Figure 6:
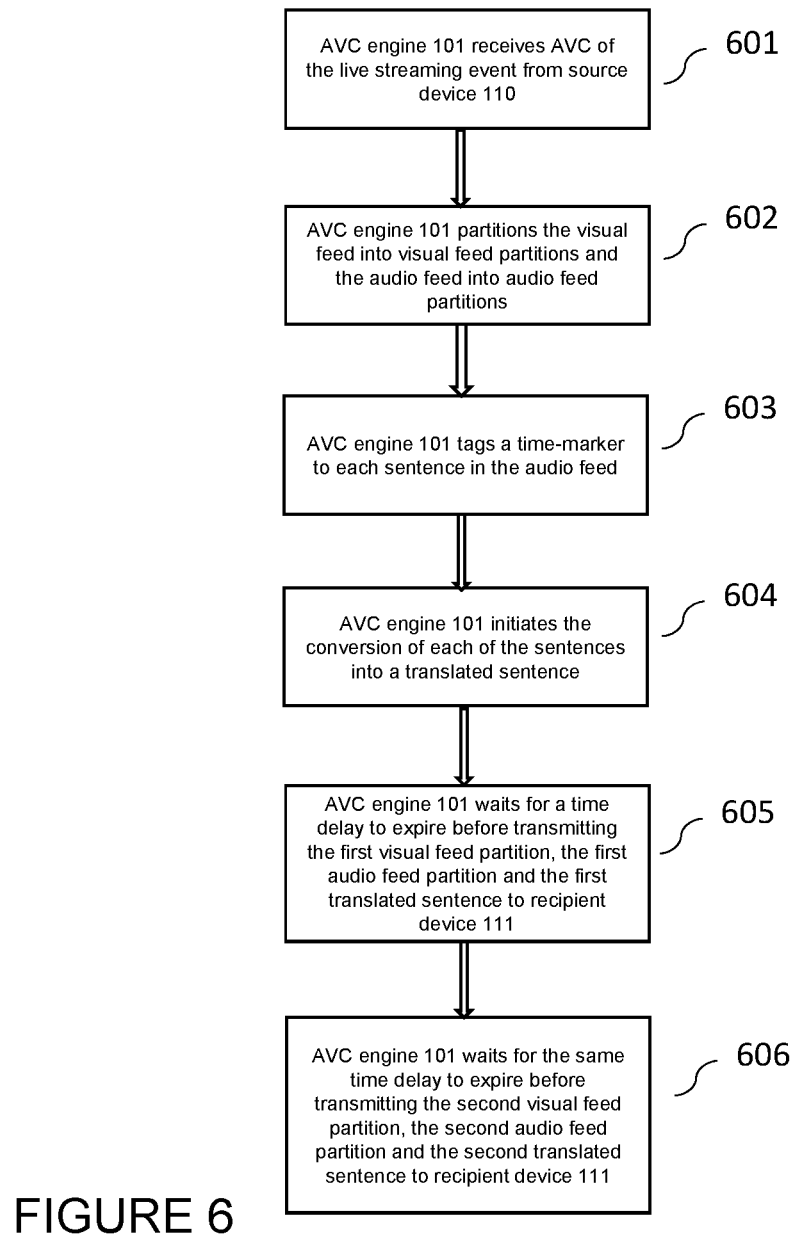
FIG. 6 is a flowchart which depicts a method for promoting interaction during a live streaming event by providing translated sentences, in accordance with embodiments of the invention.

FIG. 6 is a flowchart which depicts a method for promoting interaction during a live streaming event by providing translated sentences, in accordance with certain embodiments. In step 601, AVC engine 101 receives Audiovisual content (AVC) of the live streaming event from source device 110. The AVC can comprise a visual feed and an audio feed. The audio feed can comprise a plurality of sentences. In the context of this invention, a sentence is a portion of the audio feed comprising the spoken speech of one sentence.

In step 602, AVC engine 101 partitions the visual feed into visual feed partitions and the audio feed into audio feed partitions. Preferably, the partitioning is such that the partitions have a uniform block length. The block length can be for example, 6 seconds, 8 seconds or within a range of 6 seconds and 8 seconds.

In step 603, AVC engine 101 tags a time-marker to each sentence in the audio feed. AVC engine 101 can be configured to tag a time-marker to a sentence by assigning a time-marker with a value of a time counter when a start of a sentence is detected, and then tag the time-marker to the sentence. Data set 401 in FIG. 4 illustrates T_mark 1 being tagged to a first sentence "Hello world" while data set 501 in FIG. 5 illustrates T_mark 2 being tagged to a second sentence "Nice to meet you".

In step 604, AVC engine 101 initiates the conversion of each of the sentences into a translated sentence, while retaining the tagged time-marker. AVC engine 101 can do this by sending the sentences with the tagged time-markers to voice recognition engine 102. Voice recognition engine 102 can then extract a voice recognition component from each of the sentences, while retaining the tagged time-markers. Data set 402 in FIG. 4 illustrates T_mark 1 being tagged to the voice recognition component of "Hello world", while data set 502 in FIG. 5 illustrates T_mark 2 being tagged to the voice recognition component of "Nice to meet you". Voice recognition engine 102 can then send the voice recognition components with the tagged time-markers to translation engine 103. Translation engine 103 can then generate translated sentences from the voice recognition components, while retaining the tagged time-markers. Data set 403 in FIG. 4 illustrates T_mark 1 being tagged to the translated sentence "世界你好" while data set 503 in FIG. 5 illustrates T_mark 2 being tagged to the translated sentence "很高兴遇见你". Translation engine 103 can then send the translated sentences with the tagged time-markers to AVC engine 101.

In step 605, from the time it first receives the visual feed and the audio feed, AVC engine 101 waits for a time delay to expire before transmitting the first visual feed partition, the first audio feed partition and translated sentence "世界你好" to recipient device 111. Preferably, the time delay is equal to the block length. Recipient device 111 plays the first audio feed partition, the first visual feed partition and superimposes "世界你好" over the first visual feed partition as subtitles at T_mark 1 (i.e. 4 seconds from when the start of the first visual feed partition is played).

In step 606, from the time it sent the first visual partition, AVC engine 101 waits for the same time delay to expire before transmitting the second visual feed partition, the second audio feed partition and the translated sentence "很高兴遇见你" to recipient device 111. Recipient device 111 plays the second audio feed partition, the second visual partition and superimposes "很高兴遇见你" over the second visual feed partition as subtitles at T_mark 2 (i.e. 10 seconds from when the start of the first visual feed partition is played).

Therefore, the playing of the visual feed and the audio feed on recipient device 111 is continuous and smooth and without gaps, while the translated sentences are completely synchronized with the visual feed (for example, the subtitles will be displayed in tandem with the movement of the speaker's mouth). In such a manner, the user of recipient device 111 will be able to advantageously view and listen to the live-streaming event in near or substantially real-time (as there is a time delay before the first visual feed partition and the first audio feed partition are transmitted) without interruption, and with subtitles in his/her preferred language synchronized to the performance in the live-streaming event. This enhances the overall interactive experience and will encourage the user to participate in the live-streaming event.

Figure 7:
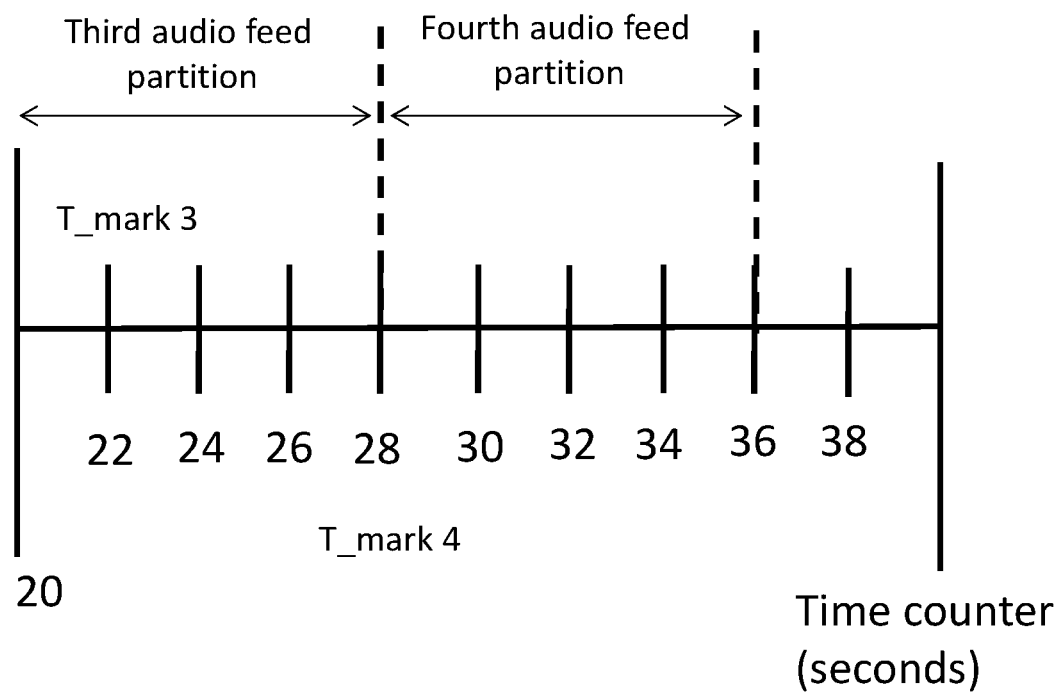
FIG. 7 provides an illustration of tagging the time-markers to sentences in the audio feed, in accordance with embodiments of the invention.

There can be situations where a sentence is not completely within a single audio feed partition (or visual feed partition), and a part of the sentence is the next audio feed partition. For example, in FIG. 7, the sentence "the weather looks bright and sunny outside today" starts in the third audio feed partition with T_mark 3 at 22 seconds. But part of it ("and sunny outside today") spills or runs into the fourth audio feed partition. Certain embodiments teach extracting the part of the sentence (which overlaps into the next partition) to create a new sentence. A time-marker is then assigned with a value of the time counter when a start of the part of the sentence has been determined; and the time-marker is tagged to the new sentence. In this example, the sentence is truncated to "the weather looks bright". A new sentence "and sunny outside today" is created. T_mark 4 is tagged to this new sentence and T_mark 4 has a value of 28 seconds. Therefore, sentences that run past the length of an audio feed partition are "broken up", with the "broken up" portion tagged to a time-marker which corresponds to the start of the next audio feed partition. This is so that the "shorter" translated sentences will be played in sync with the visual feed partitions and the audio feed partitions.

Figure 8:
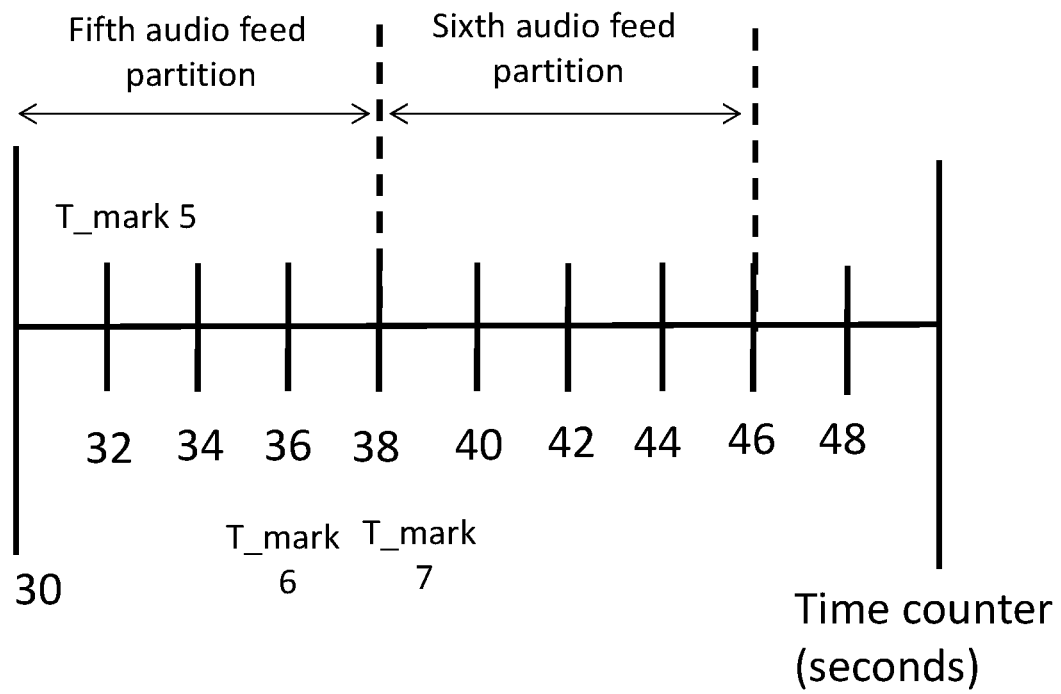
FIG. 8 provides an illustration of tagging the time-markers to sentences in the audio feed, in accordance with embodiments of the invention.

There can be situations where a first sentence and a second sentence are in a single audio feed partition (or visual feed partition), but a part of the second sentence is in the next audio feed partition. For example, in FIG. 8, the first sentence "That's great" is within the fifth audio feed partition and starts at T_mark 5 at 32 seconds. The second sentence "However, I need to renew my passport" also starts within the fifth audio feed partition at T_mark 6 (at 36 seconds), but part of it ("I need to renew my passport") spills or runs into the sixth audio feed partition. Certain embodiments teach assigning a time-marker with a value of the time counter when a start of the part of the second sentence has been determined; and tagging the time-marker to the second sentence. In this example, T_mark 6 (having a value of 36 seconds) which was the originally tagged time-marker to the second sentence, is now disregarded. Instead, T_mark 7 having a value of 38 seconds, is now tagged to the second sentence "however, I need to renew my passport". In this manner, the translated second sentence would be displayed only at T_mark 7 (38 seconds) and with the sixth audio feed partition and sixth visual feed partition. In such situations, it is apparent that the translated sentence will not be "completely synchronized" with the visual feed and the audio feed. This is however an acceptable compromise because if "part of" the translated sentences were to appear in tandem with the "part of" the sentences in the audio feed partition/visual feed partition, there can be situations where these partial translated sentences lose their original meaning. For example, if the translation of "however" appeared as subtitles with the fifth visual partition, but the translation of "I need to renew my passport" appeared as subtitles with the sixth visual partition. Therefore, in certain embodiments, the invention prioritizes the preservation of the overall meaning of the translated sentences over the "complete synchronization" of the visual feed and the audio feed with the translated sentences.

Figure 9:
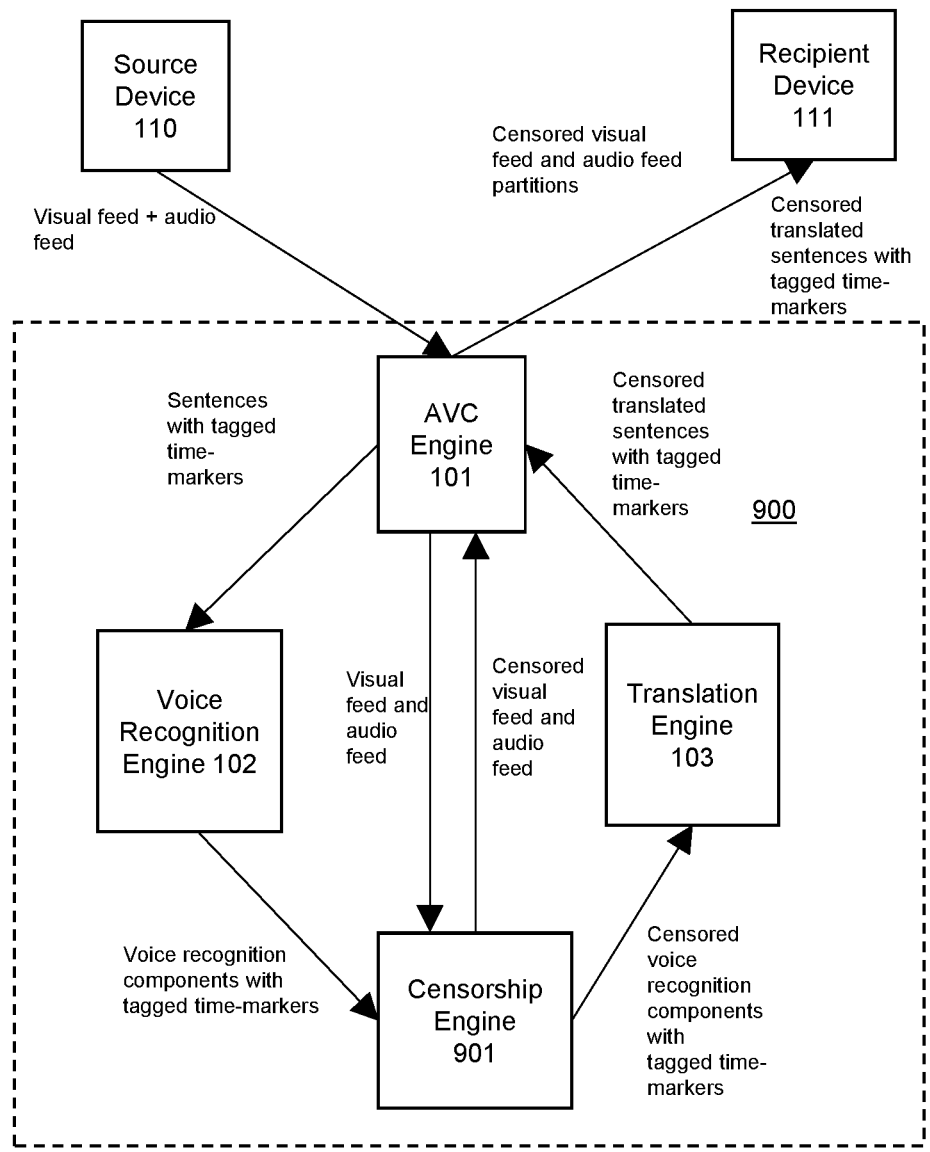
FIG. 9 shows a system for promoting interaction during a live streaming event by providing censored translated sentences, in accordance with embodiments of the invention.

FIG. 9 shows a system 900 for promoting interaction during a live streaming event by providing censored translated sentences, in accordance with certain embodiments. System 900 can comprise AVC engine 101, voice recognition engine 102 and translation engine 103 (similar to FIG. 1). In embodiments, system 900 can additionally comprise censorship engine 901. Censorship engine 901 can be configured to receive the visual feed and the audio feed from AVC engine 101, and produce censored visual feed and censored audio feed, by removing obscene images and foul language respectively. The censorship can be done prior to or after the partitioning. Censorship engine 901 can be configured to provide the censored visual feed and censored audio feed to AVC engine 101. Censorship engine 901 can also be configured to receive the voice recognition components with tagged time-markers from voice recognition engine 102, and censor the voice recognition components, and provide the censored voice recognition components with tagged time-markers to translation engine 103. In this manner, the censored voice recognition components are translated by translation engine 103. AVC engine 101 can be configured to receive the censored translated sentences with the tagged time-markers from translation engine 103. AVC engine 101 can be configured to transmit the censored audio feed partitions, the censored visual feed partitions and the censored translated sentences with the tagged time-markers to recipient device 111.

Censorship engine 901 can be any server, computer, or a group of servers or a group of computers or the like. In embodiments, AVC engine 101, voice recognition engine 102, translation engine 103 and censorship engine 901 can be the same server or be part of the same group of servers. In embodiments, censorship engine 901 can be implemented by external third party servers. In embodiments, the functionality or the application programming interface (API) of censorship engine 901 can be implemented by external third party servers.

Figure 10:
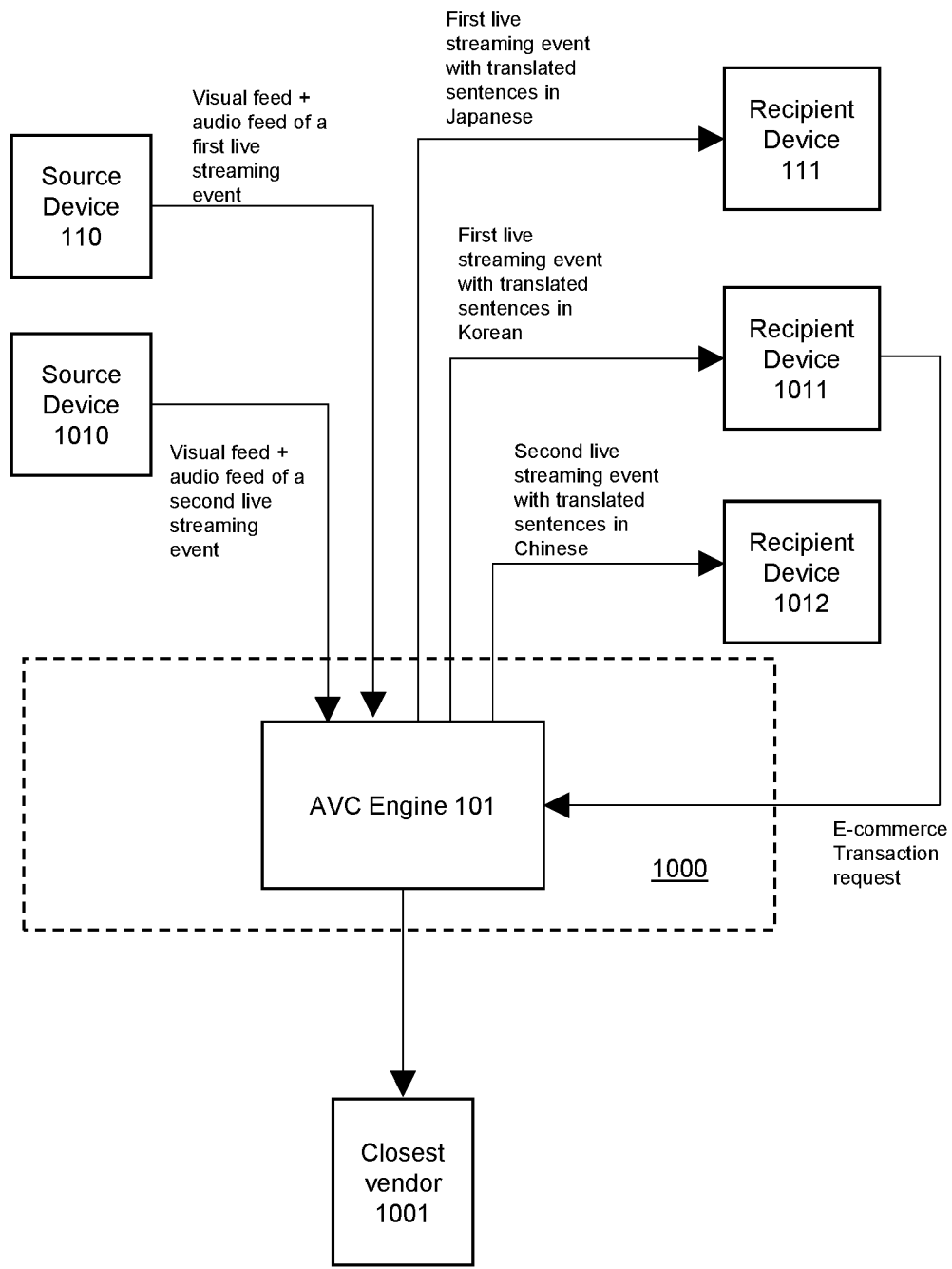
FIG. 10 shows a system for promoting interaction during multiple live streaming events by providing translated sentences and having an E-commerce function, in accordance with embodiments of the invention.

FIG. 10 shows a system 1000 for promoting interaction during multiple live streaming events by providing translated sentences and having an E-commerce function in accordance with certain embodiments. System 1000 can comprise AVC engine 101. AVC engine 101 is configured to receive the AVC (visual feed and audio feed) of live streaming events from source device 110 and source device 1010 concurrently or asynchronously. As illustrated in FIG. 10, AVC engine 101 can receive the visual feed and the audio feed of a first live streaming event from source device 110. The first live streaming event can be for example a celebrity performance. AVC engine 101 can receive the visual feed and the audio feed of a second live streaming event from source device 1010. The second live streaming event can be for example a cooking demonstration.

Users of recipient devices 111, 1011, 1012 can choose which live streaming event to view via a graphical interface on recipient devices 111, 1011, 1012. Non-exhaustively, the live streaming event can be for example an interview, a cooking class/demonstration, an artistic or musical performance etc. Depending on which live streaming event is chosen, AVC engine 101 can be configured to send the appropriate visual feed partitions, audio feed partitions and the translated sentences with the tagged time-markers in the preferred language to the respective recipient devices 111, 1011, 1012, in accordance with any of the embodiments described previously.

As illustrated in FIG. 10, recipient device 111 receives the visual feed and the audio feed of the first live streaming event (the celebrity performance) with the translated sentences in Japanese. The visual feed of the first live streaming event can be displayed on a display device of recipient device 111, and icons can be rendered on the display device. The icons can provide the user of recipient device 111 access to the integrated functionality of communicating with members of other social media platforms (E.g. Facebook, Twitter, Instagram etc) during the first live streaming event. For example, the user of recipient device 111 can send images, text messages voice recordings via an integrated messaging tool to members in other social media platforms during the live streaming event. The user of recipient device 111 can also screen capture the visual feed being displayed on recipient device 111, superimpose the user's own photo onto the screen capture, and share the mosaic with members in other social media platforms.

Via the aforementioned integrated messaging tool, the user of recipient device 111 can send text messages during the live streaming event to source device 110. The user of source device 110, who for the purpose of this example is a celebrity, can therefore receive many text messages (or questions) from many adoring fans. In embodiments, these text messages can be filtered by AVC engine 101 by real time analytics, for example to choose only the most common questions and display the shortlisted questions on source device 110.

As illustrated in FIG. 10, recipient device 1011 receives the visual feed and the audio feed of the first live streaming event (the celebrity performance) with the translated sentences in Korean, while recipient device 1012 receives the visual feed and the audio feed of the second live streaming event (the cooking demonstration) with the translated sentences in Chinese.

In embodiments, while sending the appropriate visual feed, audio feed and translated sentences in the preferred language to recipient devices 111, 1011, 1012, AVC engine 101 can be configured to receive e-commerce transaction requests from any one of recipient devices 111, 1011, 1012. These e-commerce transaction requests can be requests to purchase gift items. As illustrated in FIG. 10, AVC engine 101 receives an E-commerce transaction request from recipient device 1011. The E-commerce transaction request can be a result of the user having selected a gift item to purchase from the graphical interface on recipient device 1011. The visual feed of the first live streaming event can be displayed on recipient device 1011 and gift icons can be rendered on a display device of recipient device 1011. The user can select which gift item to purchase via the gift icons. Non-exhaustively, the gift items can be flowers, chocolates, cash donations, commercial items, fan-made products, autographed memorabilia etc. For example, while the user of recipient device 1011 is viewing the first live streaming event (the celebrity performance), the user can choose to purchase a "50 dollars flower gift basket" for the celebrity. Fans can therefore shower their favorite celebrities with the gift items via this medium. Likewise, celebrities can purchase gift items for their fans using gift icons rendered on a graphical display of source device 110.

In embodiments, AVC engine 101 can be configured to approve the e-commerce transaction request. For the purpose of approving the e-commerce transaction request, AVC engine 101 can be integrated with known payment systems in the art to authenticate the payment method selected by the user. AVC engine 101 can be configured to select a vendor to supply and deliver the purchased gift item to the physical location of source device 110 (as the first live streaming event is streamed from source device 110 and the E-commerce transaction request is sent from recipient device 1011 in this example). The celebrity or performer may or may not be the user of source device 110, but the celebrity or performer will most likely be in the vicinity of source device 110. The selection of the vendor can be based on the gift item purchased, and on the closest vendor i.e. the vendor whose locale (and the locale of its depots) is closest to the delivery location. The delivery location can be ascertained from the location information of source device 110 or be a pre-defined location of choice by the celebrity or user. AVC engine 101 can be configured to receive the location information of source device 110. The location information can be for example, the Global Positioning Satellite (GPS) coordinates of source device 110, the country code of a mobile number, an Internal Protocol (IP) address etc. Closest vendor 1001 can be selected by searching among the vendors in an expanding perimeter fashion. For example, by searching among the vendors in an expanding radii search from the GPS coordinates of source device 110. Once closest vendor 1001 has been selected, AVC engine 101 will send dispatch instructions to closest vendor 1001 to deliver the purchased flower basket to the GPS coordinates of source device 110.

Figure 11:
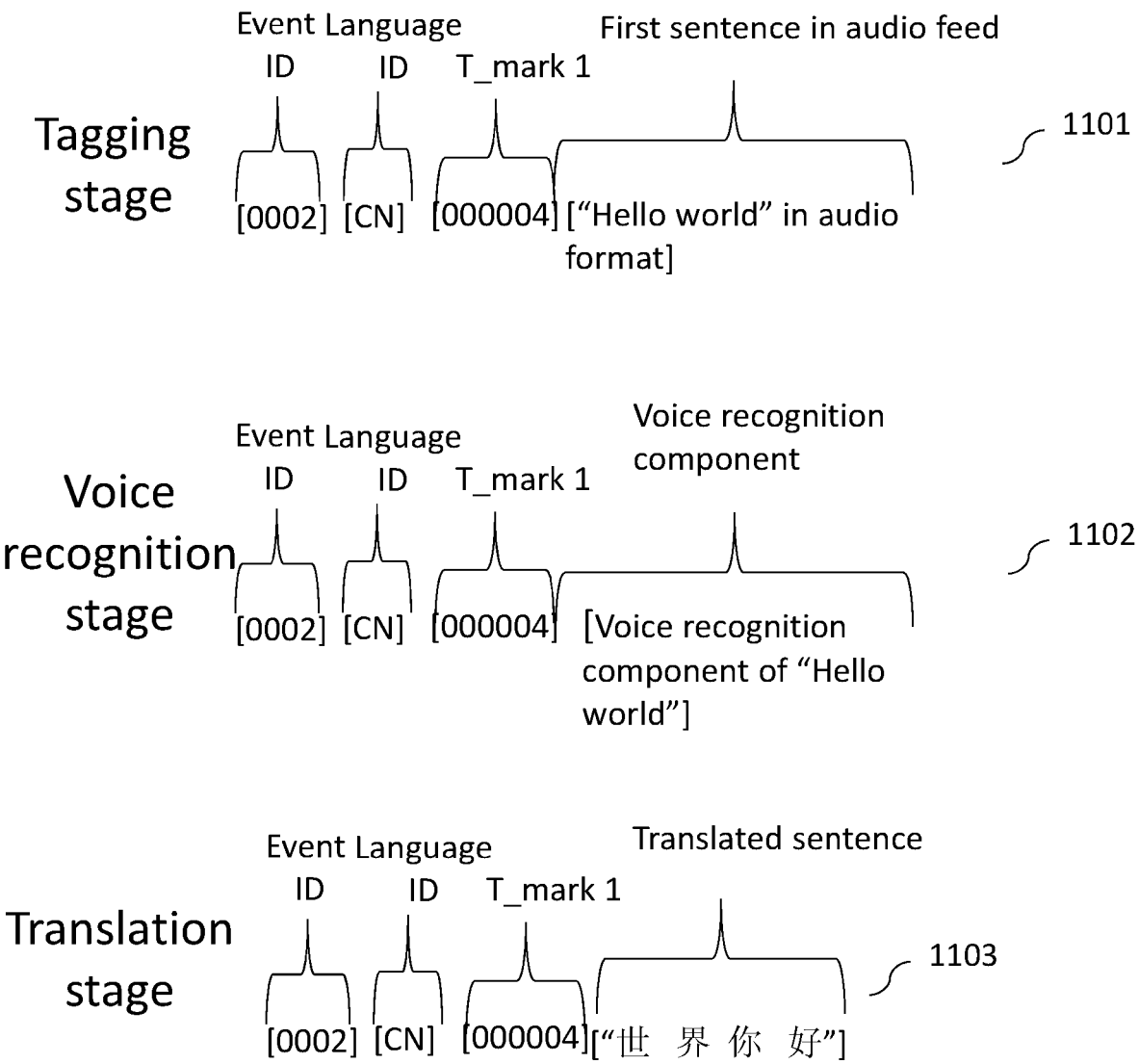
FIG. 11 shows the metamorphosis of a data set as it transitions through the tagging stage, the voice recognition stage and the translation stage, in accordance with embodiments of the invention.

In FIG. 10, recipient device 1012 is supposed to receive the AVC of the second live streaming event and the translated sentences in the Chinese language. For the purposes of ensuring that recipient device 1012 receives translated sentences corresponding to the second live streaming event, and not erroneously receive translated sentences corresponding to the first live streaming event, in embodiments, AVC engine 101 can be configured to tag an event ID (identifier) to the sentences. As illustrated in data set 1101 in FIG. 11, the event ID is tagged to the first sentence, the first sentence already having a tagged time-marker. The event ID has the value "0002" to indicate that the first sentence originates from the audio feed of the second live streaming event. Through the voice recognition stage and the translation stage, the tag event ID is retained as shown in data sets 1102, 1103 of FIG. 11, and in a similar manner to what had been described in previous embodiments for the time-markers. Therefore, by referencing the event ID of data set 1103, AVC engine 101 would know that translated sentence "世界你好" is to be sent to recipient device 1012.

Similarly, for the purpose of ensuring that recipient device 1012 receives the translated sentences in the Chinese language, in embodiments, AVC engine 101 can be configured to tag a language ID (identifier) to the sentences. As illustrated in data set 1101 in FIG. 11, the language ID is tagged to the first sentence, the first sentence already having a tagged time-marker and tagged event ID. The language ID has the value "CN" to signify that the translated sentence is to be translated to the Chinese language. Through the voice recognition stage and the translation stage, the tag language ID is retained as shown in data sets 1102, 1103 of FIG. 11, and in a similar manner to what had been described in previous embodiments for the time-markers. Translation engine 103 can reference the language ID to know what language to translate to. Also by referencing the language ID, AVC engine 101 would know that translated sentence "世界你好" is to be sent to recipient device 1012 as Chinese was the language which we requested by the user of recipient device 1012.

In embodiments, before the visual feed is provided to recipient devices 111, 1011, 1012, AVC engine 101 can be configured to augment the visual feed of the live streaming events which it receives from source devices 110, 1010. For example, AVC engine 101 can be configured to augment the visual feeds by adding three dimensional effects, backdrops, graphics etc, and then send the augmented visual feed partitions to recipient devices 111, 1011, 1012 in accordance with the previously described embodiments.

Figure 12:
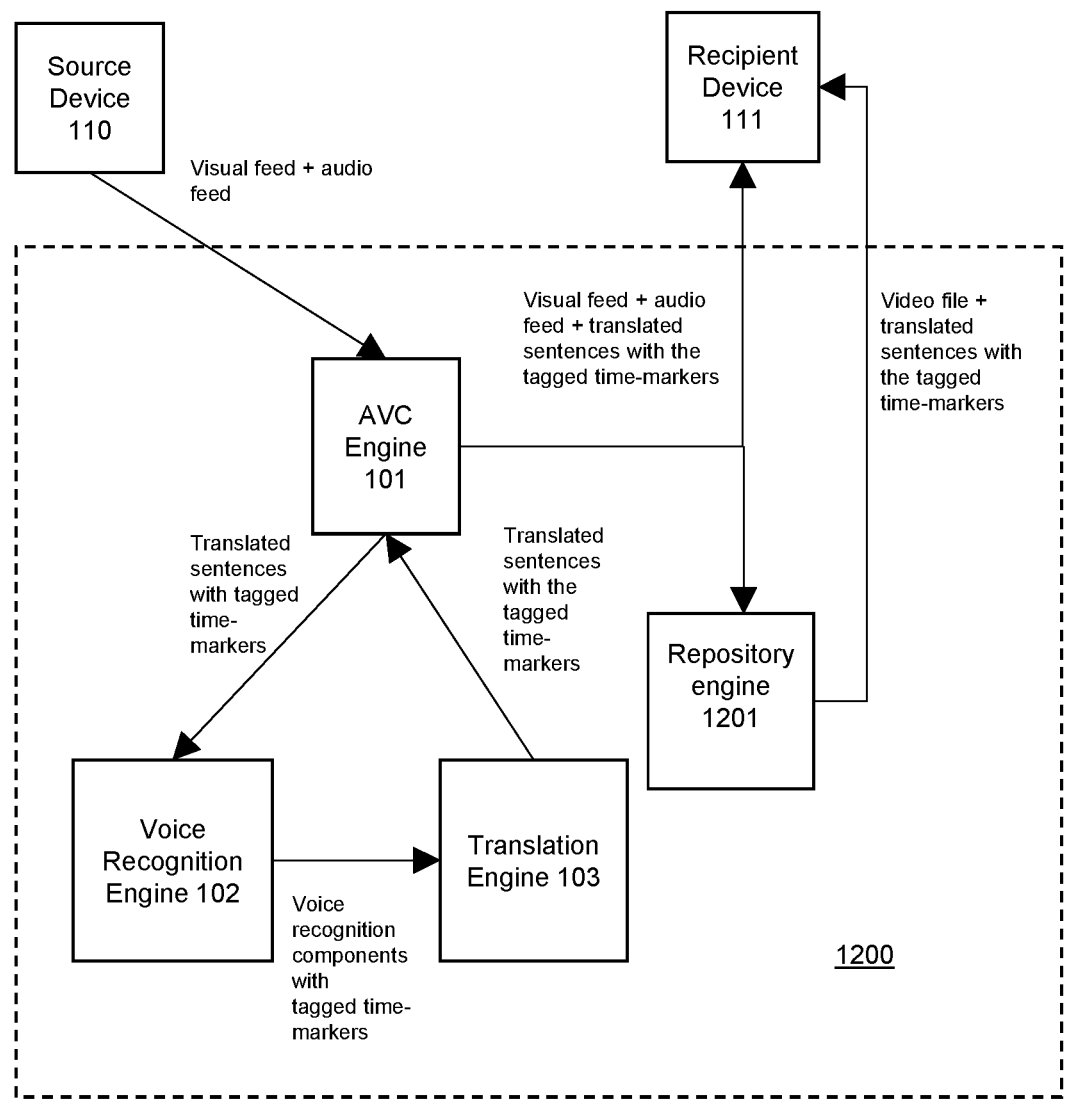
FIG. 12 shows a system having a repository engine for storing past live streaming events, in accordance with embodiments of the invention.

FIG. 12 shows system 1200 having repository engine 1201 for storing past live streaming events, in accordance with certain embodiments. In embodiments, AVC engine 101 can be configured to stitch together the audio feed partitions and the visual feed partitions of past live streaming events as a video file in repository engine 1201. In embodiments, AVC engine 101 can be configured to store the translated sentences with the tagged time-markers in repository engine 1201. In embodiments, repository engine 1201 can therefore function as an archive for past events, which can be accessed by the user of recipient device 111. In embodiments, repository engine 1201 can be configured to send the archived video files and the translated sentences with the tagged time-markers to recipient device 111 upon the user's request. Recipient device 111 will then play the video file, and play/display the translated sentences according to the tagged time-markers in accordance with the previously described embodiments.

In embodiments, the translated sentences can be in a language specified by the user of recipient device 111. If repository engine 1201 does not have translated sentences in a language that is specified by the user of recipient device 111, AVC engine 101 can initiate the conversion of the sentences of the archived video file into translated sentences in the specified language, in accordance with the previously described embodiments. When viewing the archived video files, the e-commerce function described previously is also available to recipient device 111.

In embodiments, repository engine 1201 can also be configured to receive and store user content from recipient device 111. The user content can be in form of text materials, or video, and can include productions or co-productions from fan communities or celebrities. In embodiments, repository engine 1201 can be configured to generate a digital identification for every stored user content. The digital identification can be generated and authenticated via block chain technology or other security measures. The digital identification can be tagged to the stored user content and used to ensure copyright protection of the original work.

Repository engine 1201 can be any server, computer, or a group of servers or a group of computers or the like. In embodiments, AVC engine 101, voice recognition engine 102, translation engine 103 and repository engine 1201 can be the same server or be part of the same group of servers. In embodiments, repository engine 1201 can be implemented by external third party servers.

In embodiments, while AVC engine 101 is transmitting the visual feed, the audio feed and the translated sentences with the tagged time markers to recipient device 111, AVC engine 101 is configured to allow duplex communication between source device 110 and recipient device 111. In this duplex communication mode, source device 110 and recipient device 111 take turns being the "source" and the "recipient". Furthermore, in these embodiments, AVC engine 101 no longer implements or waits for a time delay, and transmits the audio feed partitions and the visual feed partitions to recipient device 111, asynchronously from the translated sentences.

In embodiments, a peer to peer paradigm is described where recipient device 111 can perform the functions of AVC engine 101 (and AVC engine 101 is no longer necessary) and source device 110 communicates directly with recipient device 111. Recipient device 111 is configured to:—

- receive an audio feed and a visual feed of the live streaming event from source device 110, the audio feed having a speech;
- partition with a uniform block length, the visual feed into visual feed partitions and the audio feed into audio feed partitions;
- tag a time-marker to each sentence in the audio feed;
- initiate a conversion of each sentence into a translated sentence while retaining the tagged time-markers, each translated sentence having an association with one of the visual feed partitions and one of the audio feed partitions;
- waiting for a time delay to expire between playing another one of the visual feed partitions, before playing the one of the visual feed partitions, the one of the audio feed partitions and the associated translated sentence in accordance with the tagged time-marker. If the translated sentence is in the form of translated text, the translated sentence is displayed as subtitles according to the tagged time-marker. If the translated sentence is in the form of translated speech, the translated sentence is played according to the tagged time-marker while the playing of the audio feed partition is suppressed.

Unless specifically stated otherwise, and as apparent from the following, it will be appreciated that throughout the present specification, discussions utilizing terms such as "receiving", "identifying", 'initiating", "tagging", "transmitting", "running", "incrementing", "determining", "assigning", "approving", "selecting", "sending", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

In the application, unless specified otherwise, the terms "comprising", "comprise", and grammatical variants thereof, intended to represent "open" or "inclusive" language such that they include recited elements but also permit inclusion of additional, non-explicitly recited elements.

In the application, the sentences as described herein do not need to be whole complete sentences. As described in some of the embodiments, some of the sentences are broken up.

It will be apparent that various other modifications and adaptations of the application will be apparent to the person skilled in the art after reading the foregoing disclosure without departing from the spirit and scope of the application and it is intended that all such modifications and adaptations come within the scope of the appended claims.

The invention claimed is:

1. A method for promoting interaction during a live streaming event comprising:
   - receiving an audio feed and a visual feed of the live streaming event from a source device;
   - partitioning with a uniform block length, the visual feed into visual feed partitions and the audio feed into audio feed partitions;
   - tagging a time-marker to a sentence in the audio feed;
   - initiating a conversion of the sentence into a translated sentence while retaining the tagged time-marker, the translated sentence having an association with one of the visual feed partitions and one of the audio feed partitions; and
   - waiting for a time delay to expire to allow the conversion of the sentence into the translated sentence to be completed, before transmitting the one of the visual feed partitions, the one of the audio feed partitions and the translated sentence with the tagged time-marker to a recipient device, wherein the time delay is equal to the block length, and the translated sentence is played on the recipient device in accordance with the tagged time-marker.

2. The method of claim 1, wherein tagging the time-marker to the sentence in the audio feed comprises:
   - maintaining a time counter, the time counter tracking a runtime of the visual feed;
   - assigning the time-marker with a value of the time counter when a start of the sentence has been determined; and
   - tagging the time-marker to the sentence.

3. The method of claim 2, wherein tagging the time-marker to the sentence in the audio feed further comprises:
   - detecting that a part of the sentence is not within the same audio feed partition as the start of the sentence;
   - extracting the part of the sentence from the sentence to create a new sentence;
   - assigning another time-marker with a value of the time counter when a start of the part of the sentence has been determined; and
   - tagging the another time-marker to the new sentence.

4. The method of claim 2 further comprising the steps of:
   - determining a start of another sentence, the start of the another sentence in the same audio feed partition as the sentence;
   - detecting that a part of the another sentence is not within the same audio feed partition as the start of the another sentence;

assigning another time-marker with a value of the time counter when a start of the part of the another sentence has been determined; and tagging the another time-marker to the another sentence.

5. The method of claim 1, wherein initiating the conversion of the sentence into the translated sentence comprises:
sending the sentence to a voice recognition engine, the voice recognition engine for extracting a voice recognition component from the sentence; and
receiving the translated sentence from a translation engine, the translation engine for generating the translated sentence from the voice recognition component.

6. The method of claim 1, wherein the one of the visual feed partitions and the one of the audio feed partitions and the translated sentence with the tagged time-marker are transmitted to the recipient device in separate signals or are encoded together and transmitted to the recipient device in one signal.

7. The method of claim 1, wherein the translated sentence is in the form of translated text or translated speech.

8. The method of claim 1, wherein the translated sentence is in a language which is pre-selected by a user of the recipient device or is in a language which is selected based on receiving location information of the recipient device.

9. The method of claim 1, further comprising initiating the censorship of the audio feed and the visual feed.

10. The method of claim 1, further comprising:
receiving an e-commerce transaction request from the recipient device during the live streaming event, the e-commerce transaction request associated with at least one gift item;
approving the e-commerce transaction request;
selecting a vendor based on the at least one gift item; and
sending dispatch instructions to the vendor to deliver the at least one gift item.

11. The method of claim 10, wherein selecting the vendor based on the at least one gift item further comprises:
receiving location information of the source device;
determining a delivery location from the location information of the source device;
searching for the closest vendor in an expanding perimeter fashion from the delivery location.

12. The method of claim 1, further comprising augmenting the one of the visual feed partitions prior to transmission to the recipient device.

13. The method of claim 1, wherein an event ID and a language ID are tagged to the translated sentence and the translated sentence is transmitted to the recipient device in accordance with the tagged event ID and the tagged language ID.

14. The method of claim 1, further comprising archiving the audio feed, the visual feed and a plurality of translated sentences with tagged time-markers as a video file.

15. The method of claim 1, wherein there is an overlap between the another one of the visual feed partitions and the one of the visual feed partitions.

16. The method of claim 1, further comprising providing integrated functionality for communication with members of other social media platforms during the live streaming event.

17. A system for promoting interaction during a live streaming event comprising at least one server configured to perform the method as claimed in claim 1.

18. A method for promoting interaction during a live streaming event comprising:
receiving an audio feed and a visual feed of the live streaming event from a source device;
partitioning with a uniform block length, the visual feed into visual feed partitions and the audio feed into audio feed partitions;
tagging a time-marker to a sentence in the audio feed;
initiating a conversion of the sentence into a translated sentence while retaining the tagged time-marker, the translated sentence having an association with one of the visual feed partitions and one of the audio feed partitions; and
waiting for a time delay to expire to allow the conversion of the sentence into the translated sentence to be completed, before playing or displaying the one of the visual feed partitions, the one of the audio feed partitions and the translated sentence according to the tagged time-marker, wherein the time delay is equal to the block length.

19. The method of claim 18, wherein the translated sentence is in the form of translated text, and the translated sentence is displayed as subtitles according to the tagged time-marker, or wherein the translated sentence is in the form of translated speech, and the translated sentence is played according to the tagged time-marker while the playing of the audio feed partition is suppressed.

20. A system for promoting interaction during a live streaming event comprising at least one recipient device configured to perform the method as claimed in claim 18.

* * * * *